US009990375B2

(12) United States Patent
Mizoguchi (10) Patent No.: US 9,990,375 B2
(45) Date of Patent: Jun. 5, 2018

(54) MAP DATA PROCESSING DEVICE FOR VEHICLE

(71) Applicant: FUJI JUKOGYO KABUSHIKI KAISHA, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 15/059,292

(22) Filed: Mar. 2, 2016

(65) Prior Publication Data

US 2016/0259814 A1 Sep. 8, 2016

(30) Foreign Application Priority Data

Mar. 3, 2015 (JP) ................................. 2015-041601

(51) Int. Cl.
*G06F 17/30* (2006.01)

(52) U.S. Cl.
CPC .. *G06F 17/30241* (2013.01); *G06F 17/30303* (2013.01); *G06F 17/30371* (2013.01); *G06F 17/30377* (2013.01)

(58) Field of Classification Search
CPC ................................................ G06F 17/30241
See application file for complete search history.

(56) References Cited

U.S. PATENT DOCUMENTS

| 6,268,825 | B1 | 7/2001 | Okada | |
|---|---|---|---|---|
| 9,316,718 | B2* | 4/2016 | Stahlin | ................. G01S 5/0072 |
| 2001/0040627 | A1* | 11/2001 | Obradovich | ..... G08G 1/096716 |
| | | | | 348/222.1 |
| 2004/0024502 | A1* | 2/2004 | Squires | ................. A62C 27/00 |
| | | | | 701/29.3 |

(Continued)

FOREIGN PATENT DOCUMENTS

| CN | 102012232 A | 4/2011 |
|---|---|---|
| CN | 104121915 A | 10/2014 |

(Continued)

OTHER PUBLICATIONS

Office Action Received for Chinese Patent Application No. 201610108434.2, dated Jan. 25, 2017, 6 Pages of Office Action.

(Continued)

*Primary Examiner* — Syed H Hasan
(74) *Attorney, Agent, or Firm* — Chip Law Group (57) ABSTRACT

In a map data processing device for a vehicle, a map database has first map data of a road on which the vehicle travels. A map data computing module computes second map data of the road based on a surrounding environment and a traveling state of the vehicle. An update data computing module computes update data for updating the map database, based on a reliability of the second map data. An update determining module then compares the first map data with the update data. When both disagree with each other, the update determining module determines whether to update first map data with the update data, based on a (Continued)

frequency of discrepancy and the reliability. A data processing module executes a processing of updating the map database in accordance with a determination result by the update determining module.

17 Claims, 3 Drawing Sheets

(56) References Cited

U.S. PATENT DOCUMENTS

| | | | | |
|---|---|---|---|---|
| 2007/0112503 | A1* | 5/2007 | Johnson | G08G 1/0104 701/117 |
| 2008/0162041 | A1* | 7/2008 | Nakamura | G01C 21/32 701/533 |
| 2008/0262721 | A1* | 10/2008 | Guo | G01C 21/32 701/532 |
| 2009/0210147 | A1* | 8/2009 | Bauer | G01C 21/20 701/467 |
| 2009/0257621 | A1* | 10/2009 | Silver | G06K 9/6202 382/103 |
| 2010/0318519 | A1* | 12/2010 | Hadjieleftheriou | G06F 17/30336 707/742 |
| 2011/0071756 | A1* | 3/2011 | Stahlin | G01C 21/32 701/532 |
| 2011/0125401 | A1* | 5/2011 | Stahlin | G01C 21/26 701/532 |
| 2012/0023057 | A1* | 1/2012 | Winberry | G09B 29/00 706/50 |
| 2012/0054145 | A1* | 3/2012 | Suzuki | G01C 21/3492 706/52 |
| 2012/0131084 | A1* | 5/2012 | Stahlin | G09B 29/004 709/201 |
| 2013/0261961 | A1* | 10/2013 | Cardoso, Jr. | G01C 21/00 701/467 |
| 2014/0025292 | A1 | 1/2014 | Stahlin et al. | |
| 2014/0350839 | A1* | 11/2014 | Pack | G01C 21/30 701/409 |
| 2015/0354968 | A1* | 12/2015 | Mizuno | G09B 29/106 701/534 |
| 2016/0069690 | A1* | 3/2016 | Li | G01C 21/206 701/412 |

FOREIGN PATENT DOCUMENTS

| | | |
|---|---|---|
| DE | 102010029073 A1 | 11/2010 |
| DE | 102012212740 A1 | 5/2014 |
| JP | 3328939 B | 9/2002 |
| JP | 2005-147713 A | 6/2005 |
| JP | 2005269125 A * | 9/2005 |
| JP | 2010060573 A * | 3/2010 |
| JP | 2011-215651 A | 10/2011 |
| JP | 2012-173266 A | 9/2012 |

OTHER PUBLICATIONS

Office Action for DE Patent Application No. 102016102283, dated Mar. 12, 2018, 5 pages of Office Action and 3 pages of English Translation.

* cited by examiner

MAP DATA PROCESSING DEVICE FOR VEHICLE

CROSS-REFERENCE TO RELATED APPLICATIONS

The present application claims priority from Japanese Patent Application No. 2015-041601 filed on Mar. 3, 2015, the entire contents of which are hereby incorporated by reference.

BACKGROUND

1. Technical Field

The present disclosure relates to a map data processing device for a vehicle, the map data processing device processing map data of a road on which a vehicle travels.

2. Related Art

Recent years have seen a system developed in which a vehicle such as an automobile equips a navigation device that displays the current position on a map for guiding a route to a destination with a database having more accurate map data, and uses these high-definition map data for its alarm control and traveling control over the vehicle.

For example, Japanese Patent No. 3328939 discloses a technique of installing a detailed map database used for traveling control in addition to a map database for guiding a route, acquiring detailed data of a road shape from a value detected by an onboard sensor and data of the map database, and supplying the acquired detailed data to the detailed map database.

Although Japanese Patent No. 3328939 discloses the technique of acquiring detailed data of a road shape from a value detected by an onboard sensor and data of the map database, map data disagreeing with the actual road situation and environment may deteriorate precision in traveling control because the detailed map database is characteristically used for the traveling control over a vehicle. Accordingly, the technique disclosed in Japanese Patent No. 3328939 has to constantly keep the map data updated.

SUMMARY OF THE INVENTION

The present disclosure has been achieved in view of the above-described disadvantages, and the present disclosure provides a map data processing device for a vehicle, the map data processing device being capable of accurately recognizing the difference between a detailed map database used for traveling control and the actual road situation and environment, keeping the database updated, and exerting accurate traveling control.

A map data processing device for a vehicle according to an aspect of the present disclosure includes: a map database that has first map data of a road on which the vehicle travels; a map data computing module that computes second map data of the road on the basis of a surrounding environment of the vehicle and a traveling state of the vehicle; an update data computing module that computes update data for updating the map database, on the basis of a reliability of the second map data; an update determining module that compares the first map data with the update data, and determines, when an error between the first map data and the update data is greater than or equal to a determination value, whether to update the first map data with the update data, on the basis of the reliability and a frequency of discrepancy in which the error is greater than or equal to the determination value; and a data processing module that executes a processing of updating the map database in accordance with a determination result by the update determining module.

DETAILED DESCRIPTION

Hereinafter, a preferred implementation of the present disclosure will be described in detail with reference to the appended drawings. Note that, in this specification and the appended drawings, structural elements that have substantially the same function and structure are denoted with the same reference numerals, and repeated description of these structural elements is omitted.

Hereinafter, an implementation of the present disclosure will be described with reference to the appended drawings. A reference numeral 1 represents a vehicle (subject vehicle) such as an automobile in FIG. 1, and this subject vehicle 1 is equipped with a driving assist system 2 that exerts driving assist control including automated driving over a driving operation of a driver, the automated driving requesting no operation from the driver. The driving assist system 2 includes a variety of devices that acquire information on the external environment of the subject vehicle 1, and a variety of sensors that detect the traveling state of the subject vehicle 1.

Figure 1:
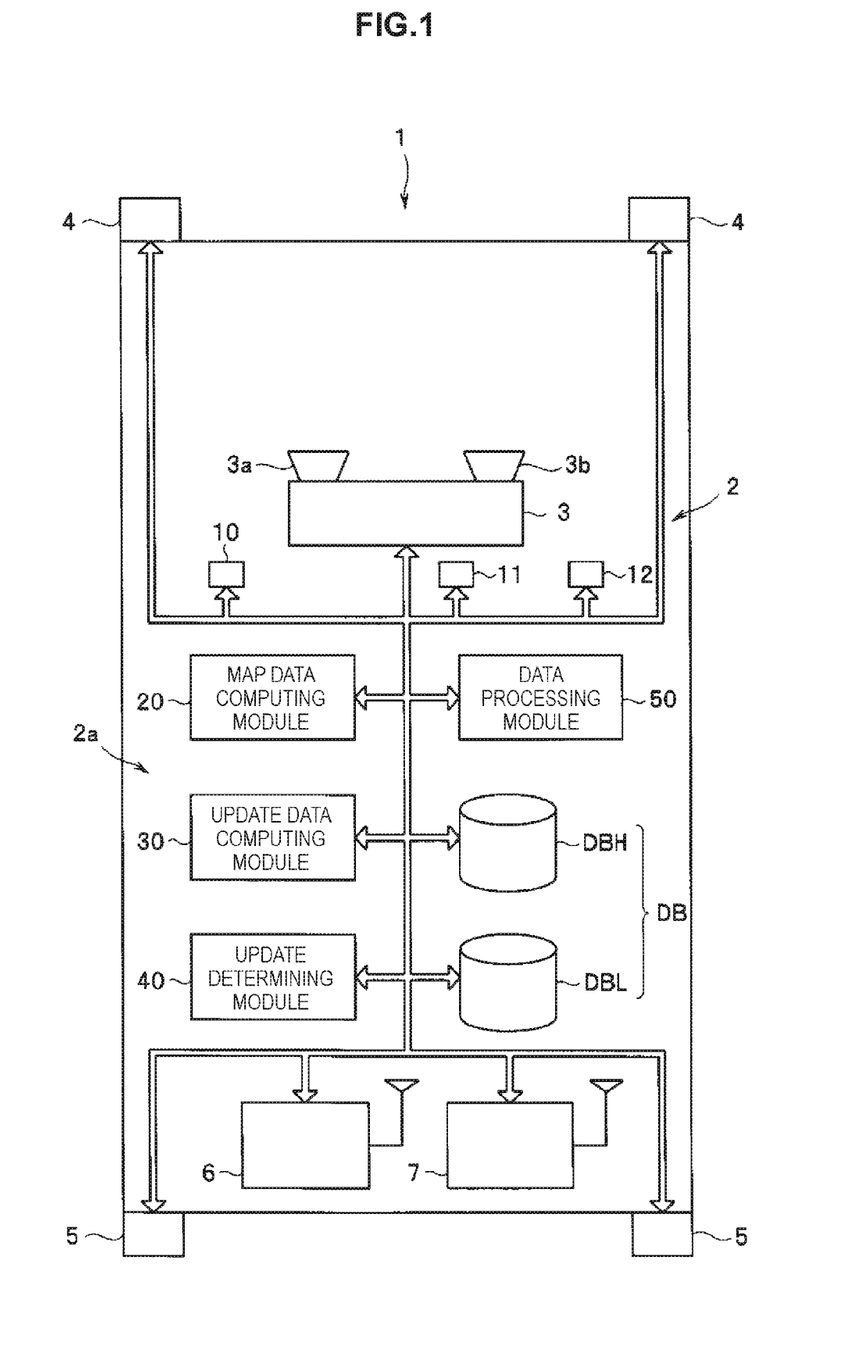
FIG. 1 illustrates a configuration of a driving assist system for a vehicle.

In the present implementation, the driving assist system 2 includes, as devices that sense the external environment, a stereo camera unit 3 that detects the three-dimensional position of an object in front of the vehicle 1, lateral radar units 4 that each detect an object diagonally in front of the vehicle 1, and rear radar units 5 that each detect an object behind the vehicle 1 with microwaves and the like. The driving assist system 2 further includes a navigation unit 6 that has map information, and a traffic information communicating unit 7 that acquires traffic information through infrastructure communication such as road-to-vehicle communication and vehicle-to-vehicle communication.

The stereo camera unit 3 chiefly includes a stereo camera including the two of left and right cameras 3a and 3b that are, for example, installed near the rearview mirror inside the windshield at the upper part of the vehicle interior. The two of the left and right cameras 3a and 3b include image sensors such as a CCD and CMOS and are synchronized with the shutters. The two of the left and right cameras 3a and 3b have a predetermined base line length upon fixation. This stereo camera unit 3 is integrated with an image processor that performs stereo image processing on a pair of images shot by the left and right cameras 3a and 3b, and acquires information on the three-dimensional position of an object such as a preceding vehicle in front of the subject vehicle in real space. The three-dimensional position of the object is converted from disparity data and an image coordinate value of the object obtained through the stereo image processing to a coordinate value in the three-dimensional space, in which the road surface right under the center of the stereo cameras serves, for example, as an origin, the vehicle width direction serves as an x axis, the vehicle height direction serves as a y axis, and the vehicle length direction (distance direction) serves as a z axis.

The lateral radar units 4 are each a proximity radar that detects an object relatively close to the subject vehicle. The lateral radar units 4 are installed, for example, at the left and right corners of the front bumper. The lateral radar units 4 transmit radar waves such as microwaves and high bandwidth millimeter waves to the outside and receive the reflected waves from the object, and measure the distance to and the direction of the object diagonally in front of the subject vehicle, which is located outside the field of view of the stereo camera unit 3. Meanwhile, the rear radar units 5 are installed, for example, at the left and right corners of the rear bumper. The rear radar units 5 transmit radar waves to the outside and receive the reflected waves from an object in the same way, and measures the distance to and the direction of the object in the areas behind the subject vehicle and diagonally behind the subject vehicle.

Note that the object behind the subject vehicle may also be detected through image recognition by a rearview camera, or a sensor fusion of the image recognition into another sensing device.

The navigation unit 6 has map information on traveling environments such as the positions of intersections and traffic lights, the number of lanes of roads, the curvature radii of roads, maximum speed and no-passing zones, and displays the position of the subject vehicle on the map measured, for example, by a GPS on the display. Meanwhile, through road-to-vehicle communication via facilities installed on roads and vehicle-to-vehicle communication with another vehicle, the traffic information communicating unit 7 acquires, for example, traffic information on areas and crossroads that the stereo camera unit 3, the lateral radar unit 4, or the rear radar units 5 fail to recognize (sense).

The traffic information communicating unit 7 may be installed as a dedicated device, but may also be integrated with the navigation unit 6.

Examples of sensors that detect the traveling state of the subject vehicle 1 include a vehicle speed sensor 10 that detects the vehicle speed, a yaw rate sensor 11 that detects the yaw rate, and a steering angle sensor 12 that detects the steering angle. The driving assist system 2 exerts driving assist control over the vehicle 1 on the basis of the traffic environments around the subject vehicle 1 acquired by the respective units 4 to 6 and the traveling state of the subject vehicle 1 detected by a variety of sensors such as the vehicle speed sensor 10, the yaw rate sensor 11, and the steering angle sensor 12.

The driving assist control exerted by the driving assist system 2 includes, for example, passing a preceding vehicle, keeping a lane, exerting adaptive cruise control including automatically merging into an expressway, exerting automatic obstacle avoiding control, exerting temporary stop and intersection passing control due to a detected sign and traffic light, and exerting emergency control of pulling over on a road shoulder in case of trouble in addition to automated driving that requests no operation from a driver. These kinds of control are exerted using map information of a map database DB managed by a map data processing device 2a along with recognition information on the environment around the subject vehicle and detected information on the traveling state of the subject vehicle.

The following describes a function of the driving assist system 2 for managing map information. The driving assist system 2 includes the map data processing device 2a including the map database DB, a map data computing module 20, an update data computing module 30, an update determining module 40, and a data processing module 50. The map data processing device 2a creates and adds new data, and updates the existing data for the map database DB.

The map database DB includes two databases: a map database DBL that is, for example, referenced chiefly by the navigation unit 6, and a map database DBH that has more detailed data than that of the map database DBL. The map database DBL has map data for guiding a vehicle traveling route and displaying the current position of the vehicle, while the map database DBH has high-definition map data for driving assist control including automated driving.

Figure 2:
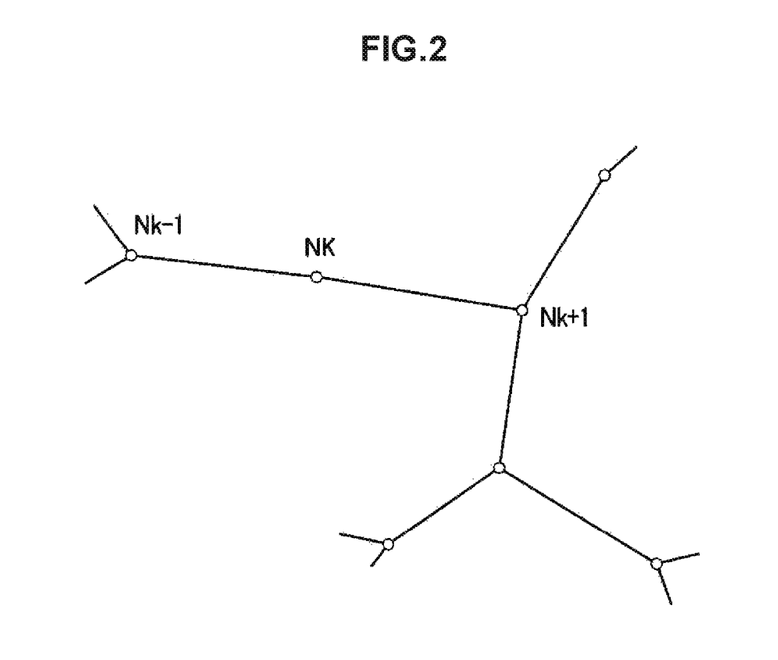
FIG. 2 illustrates navigation map data.
Figure 3:
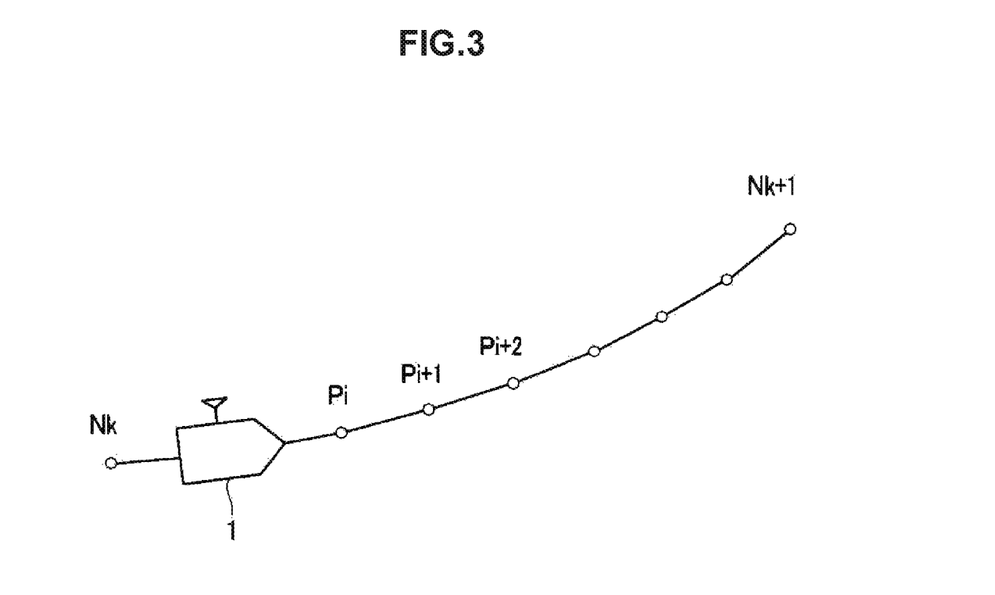
FIG. 3 illustrates map data for traveling control.

The map database DBL for navigation has the current node Nk coupled with the former node Nk−1 and the next node Nk+1 via the respective links as illustrated in FIG. 2, and each link stores, for example, information on traffic lights, road signs, and buildings. Meanwhile, the high-definition map database DBH for traveling control has data points Pi, Pi+1, Pi+2, . . . between the node Nk and the node Nk+1 as illustrated in FIG. 3. This data point Pi retains road shape data such as the curvature, lane width, and road shoulder width of a road on which the subject vehicle 1 travels, and traveling control data such as the road azimuth, the type of road white line, and the number of lanes along with attribute data such as reliabilities and data update dates as discussed below.

The map data processing device 2a checks the nodes, links, and data points of the map database DB to constantly keep them updated, and additionally creates and adds new data for an area the data of which are not present in the database to construct a more detailed database. The data of this map database DB are updated and new data are added to the map database DB irrespective of driving modes such as automated driving and manual driving. The data of the map database DB are updated and new data are added to the map database DB chiefly with respect to data points in the following description, but the same applies to nodes and links.

Additionally, the map database DB may be constructed on a storage medium of an external server device. The map database DB may also be recorded on at least one of the storage medium of the external server device and a storage medium of the driving assist system 2. The database is updated in the following description chiefly with respect to the high-definition map database DBH for control, but the present disclosure is not limited thereto. For example, the database is also updated with respect to the map database DBL for display to support road shapes changed through road works.

The map data computing module 20 uses the map data of the map database DB as first map data to compute second map data based on a recognition result of the surrounding environment and the traveling state of the vehicle. For example, when control information necessary for exerting control to keep a lane in automated driving is computed as the second map data, data such as the road curvature, the road azimuth, the lane width, the type of white line, the number of lanes, and the road shoulder width at the data point Pi identified from information on the latitude and longitude measured by a GPS are computed on the basis of a lane recognition result by the stereo camera unit 3 and the traveling state detected by the vehicle speed sensor 10 and the yaw rate sensor 11.

When the existing road shape is changed by a new road that the map database DB has not yet stored or road works, the map data computing module 20 uses both or one of a recognition result of the surrounding environment by the stereo camera unit 3 and a detection result of the traveling state of the vehicle by an onboard sensor such as the vehicle speed sensor 10 and the yaw rate sensor 11 to compute road shape data such as the road curvature, the cant, and the longitudinal slope as new data on the basis of the latitude, longitude, and azimuth acquired by the GPS, and adds the computed new data to the map database DB.

The update data computing module 30 computes update data Cr for updating the map data of the map database DB from the map data computed by the map data computing module 20 on the basis of the reliability R of the data. The reliability R has a maximum value Rmax (e.g. Rmax=10) when the recognition state of the external environment by the stereo camera unit 3, the vehicle behavior (such as a yaw rate change and a change in the lateral acceleration) detected by an onboard sensor, and the reception state of GPS signals are stable and the difference between the last value and latest value of the map data computed by the map data computing module 20 is small. The recognition state, the vehicle behavior, and the reception state of GPS signals increase or decrease the value of the reliability R.

For example, if the last map data at the data point Pi are represented as $C_{i-1}$, the reliability of the data $C_{i-1}$ is represented as $R_{i-1}$, the latest map data are represented as $C_i$, and the reliability of the data $C_i$ is represented as $R_i$, the update data Cr based on the reliability R are computed in accordance with the relationships between the reliabilities $R_{i-1}$ and $R_i$ as shown in (a1) to (a3) below.

(a1) The difference between $C_{i-1}$ and $C_i$ is smaller than a setting value and $R_i$=Rmax is satisfied The latest map data $C_i$ are computed as the update data Cr as shown in the following (1) expression. In this case, a large difference from the map database DB causes the database to be updated as discussed below.

$$Cr=C_i \quad (1)$$

(a2) $R_{i-1}<R_i$ is satisfied

The last map data $C_{i-1}$ and the latest map data $C_i$ are weighted and averaged using the reliabilities $R_{i-1}$ and $R_i$ as shown in the following (2) expression, thereby computing the update data Cr.

$$Cr=(C_{i-1} \times R_{i-1}+C_i \times R_i)/(R_{i-1}+R_i) \quad (2)$$

(a3) $R_{i-1}>R_i$ is satisfied

If the reliability of the latest data falls below that of the last data, the last data $C_{i-1}$ are retained as the update data Cr as shown in the following (3) expression.

$$Cr=C_{i-1} \quad (3)$$

When the map database DB is installed and managed in the external server device connected to the subject vehicle through wireless communication, data that are the average of the data of all the vehicles connected to the server device are used as map data for computing the update data.

The update determining module 40 compares the map data of the map database DB with the update data, and when the error between both data is greater than or equal to a determination value, the update determining module 40 determines whether to update the map data of the map database DB with the update data. The determination value for the error is set as a threshold for determining whether to tolerate such an error that does not cause trouble between control based on the map data and control based on the environment recognition result. When the map data of the map database DB disagree with the update data by an error greater than or equal to the determination value, the update determining module 40 determines which of the map data of the map database DB and the update data are correct, and decides whether to update the map data of the map database DB.

It is decided under the following conditions shown in (b1) to (b3), on the basis of the reliability R and the frequency N with which the map data of the map database DB disagree with the update data, whether to update the map data of the map database DB.

(b1) The recognition state of the external environment, the vehicle behavior, and the reception state of GPS signals are all highly stable If the recognition state of the external environment by the stereo camera unit 3, the vehicle behavior (such as a yaw rate change and a change in the lateral acceleration) detected by an onboard sensor, and the reception state of GPS signals are highly stable and the difference between the last value and latest value of the update data is small, the update determining module 40 determines that the map data computed from the recognition of the external environment and the traveling state of the vehicle are more correct than the value of the database.

When a condition is satisfied that the product of the frequency N of discrepancy and the reliability R is greater than or equal to a threshold Dset as shown in the following (4) expression, the update determining module 40 permits the updating of the map database DB. The threshold Dset is set in a manner that the condition is satisfied at relatively less attempts, supposing that the reliability R in the scene of (b1) has a maximum value.

$$N \times R \geq Dset \quad (4)$$

(b2) The recognition state of the external environment, the vehicle behavior, and the reception state of GPS signals are intermediately stable If any of the recognition state of the external environment, the vehicle behavior, and the reception state of GPS signals is slightly unstable or intermediately stable, the map data are repeatedly weighted and averaged in accordance with the reliability R to increase the reliability of the update data Cr. When the condition of the (4) expression is satisfied, an instruction is issued to update the map database DB.

(b3) Any of the recognition state of the external environment, the vehicle behavior, and the reception state of GPS signals is unstable The reliability of the update data Cr is low in this case, and the condition of the (4) expression is thus not satisfied. Consequently, the map database DB is not permitted to be updated.

(b4) The traveling frequency of a road

The dates when the vehicle travels on a road are also taken into consideration. The update determining module 40 considers a road having a high traveling frequency computed from the date data to have a high reliability when the proportion of the frequency N of discrepancy to the traveling frequency is greater than or equal to the threshold, and permits the map database DB to be updated. To the contrary, regarding a road having a low traveling frequency, the update determining module 40 determines in accordance with the scene of (b1) whether to update the map database DB when the recognition state of the external environment, the vehicle behavior, and the reception state of GPS signals are all stable.

The data processing module 50 performs processing of updating the map database DB, and additionally performs processing of creating new data and adding the created new data when there is an area data of which are not present in the map database DB. When an instruction is issued to update the map database DB in accordance with a determination result of the update determining module 40, the map database DB is updated with the map data of the map database DB replaced with the update data. New map data are appropriately added to the map database DB in accordance with this processing of updating the map data.

When the recognition state of the external environment, the vehicle behavior, and the reception state of GPS signals are all stable and the map database DB does not have the corresponding road information, new map data are created and added. A data item to be created is the same as that of the update data, and the same processing as processing of creating the update data Cr is performed to update the data every time the vehicle travels on the same road.

Created new data has interpolation points (new nodes or data points) at predetermined intervals. In this case, even when it is possible to estimate data of the interpolation points from the road information of the map database DB, the interpolation points are created as long as it is determined that a more detailed database can be created with the interpolation points. When the vehicle continuously travels from an area road information on which is not present to an area road information on which is present, this section is regarded as a link.

Even if, during map creation, the subject vehicle travels on a road having a low traveling frequency or on a lane different from the lane on which the vehicle traveled last time, the position of the subject vehicle is corrected with the recognition of the surrounding environment chiefly in terms of the lane and road on which the subject vehicle travels in order to create detailed map data.

Figure 4:
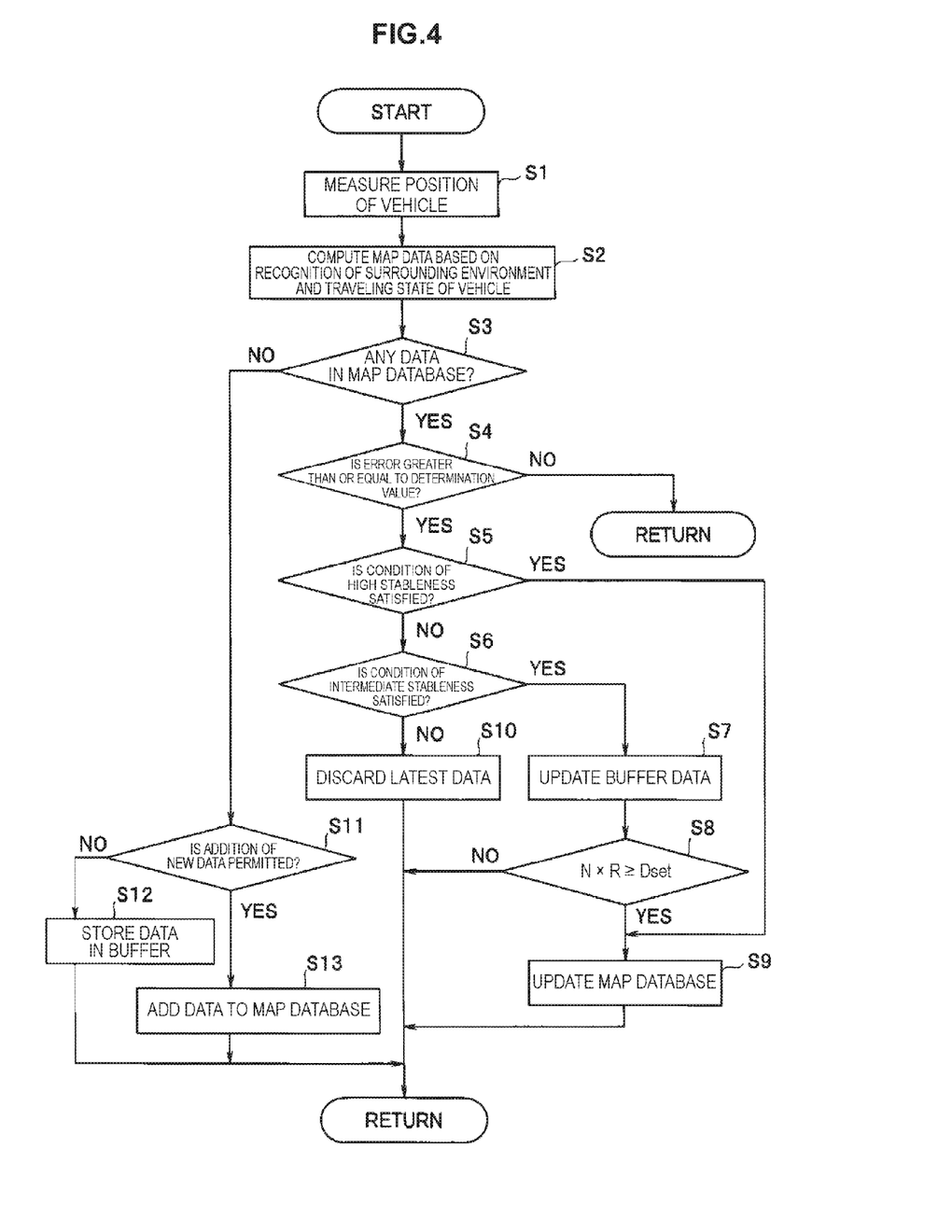
FIG. 4 is a flowchart illustrating data processing in a map database.

Next, program processing for data processing on the map database DB will be described with reference to the flowchart illustrated in FIG. 4. Note that data points are here updated and added, but the same applies to nodes and links.

First of all, in step S1 of this processing, the position of the subject vehicle is measured by a GPS. The position of the vehicle is measured at predetermined intervals that, for example, correspond to the intervals of data points. In step S2, map data such as the road curvature and the yaw angle to the lane are computed on the basis of a recognition result of the surrounding environment and the traveling state of the vehicle by the stereo camera unit 3 and an onboard sensor, and is recorded and stored in a buffer along with the position data of the subject vehicle and the data acquisition date and time.

Next, in step S3, it is examined whether or not the latest map data of the vehicle position are present at the corresponding data point of the map database DB. As a result, if the map database DB has the corresponding data point, processing of updating the database is performed from step S4 onward. If the map database DB does not have the corresponding data point and the database has no map data, processing of creating and adding new data is performed from step S11 onward.

First, the processing of updating the database performed from step S4 onward will be described. In step S4, the map data (update data) stored in the buffer are compared with the map data stored in the map database DB with respect to the same data point. If the map data stored in the buffer agree with the map data stored in the database within an error smaller than the determination value, the flow exits the present processing. To the contrary, if the map data stored in the buffer disagree with the map data stored in the database by an error greater than or equal to the determination value, the flow proceeds to step S5.

In step S5, it is examined whether or not a condition is satisfied that the recognition state of the external environment by the stereo camera unit 3, the vehicle behavior by an onboard sensor, and the reception state of GPS signals are all highly stable. If all of them are highly stable, it is determined that the map data computed by the subject vehicle are correct and the flow proceeds from step S5 to step S9 in which the map data of the map database DB are updated using the computed latest map data as the update data Cr. The reliability R of the data is then considered to have the maximum value Rmax, and the data update date is also recorded.

If the condition of high stableness is not satisfied in step S5, the flow proceeds from step S5 to step S6 in which it is further examined whether or not a condition is satisfied that any of the recognition state, the vehicle behavior, and the reception state of GPS signals is slightly unstable or intermediately stable. If the recognition state, the vehicle behavior, and the reception signal of GPS signals are intermediately stable, the previous data stored in the buffer are updated with the latest data in step S7, and the flow proceeds to step S8. Updating these buffer data corresponds to weighting and averaging the buffer data to compute the update data Cr on the basis of the reliabilities as described with the (2) expression. The update date is recorded along with the reliability.

In step S8, it is examined whether or not the product of the reliability R and the frequency N with which the map data stored in the buffer disagree with the map data stored in the map database DB by an error greater than or equal to the determination value is greater than or equal to the threshold Dset. If N×R<Dset is satisfied, the flow exits the present processing. If N×R≥Dset is satisfied, the map database DB is updated in step S9.

To the contrary, if the condition of intermediate stableness is not satisfied in step S6, it is determined that any of the recognition state of the external environment, the vehicle behavior, and the reception state of GPS signals is unstable. The latest data are discarded in step S10, the database is not updated, and the flow exits the present processing.

Next, the processing of creating and adding new data from step S11 onward will be described. In step S11, it is examined whether or not a condition for permitting the creation and addition of a new data point is satisfied when the map database DB does not have the corresponding data point. This permission condition on a new data point is satisfied when the recognition state of the external environment, the vehicle behavior, and the reception state of GPS signals are all stable and the same condition as the condition for updating the data is satisfied.

If the permission condition on a new data point is not satisfied in step S11, the data are stored in the buffer in step S12 and the flow exits the present processing. To the contrary, if the permission condition is satisfied, a new data point is created and data are added to the map database DB in step S13.

As described above, the update data are, on the basis of the reliability, computed from the map data computed on the basis of a recognition result of the surrounding environment and the traveling state of the vehicle, and compared with the map data of the map database DB in the present implementation. When both disagree with each other by an error larger than or equal to the determination value, it is determined which of the map data of the map database DB and the update data are correct, on the basis of the frequency of discrepancy and the reliability, and it is decided whether to update the map data of the map database DB. This makes it possible to accurately recognize the difference between a detailed map database used for traveling control and the actual road situation and environment, to keep the database updated, and to exert accurate traveling control. In particular, more precise traveling control can be exerted on a road on which the subject vehicle frequently travels.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A map data processing device, comprising:
a map database that has first map data of a road on which a vehicle travels;
a map data computing module configured to compute second map data of the road based on a surrounding environment of the vehicle and a traveling state of the vehicle;
an update data computing module configured to compute update data to update the map database, based on a reliability of the second map data, the reliability being a numerical value that is set based on at least stability of a recognition state of the surrounding environment by one or more cameras equipped on the vehicle, stability of vehicle behavior detected by one or more sensors equipped on the vehicle, and stability of reception state of GPS signals received by the vehicle;
an update determining module configured to:
compare the first map data with the update data;
determine an error between the first map data and the update data; and
determine, by an update determination, to update the first map data with the update data, wherein the determination to update the first map data with the update data is based on at least a multiplication product of the reliability and a frequency with which the error is greater than or equal to a first determination value; and
a data processing module configured to update the map database with the update data based on at least a result of the update determination.

2. The map data processing device according to claim 1, wherein the update data computing module is further configured to:
weight pieces of the second map data with the reliability; and
compute the update data based on an averaging process on the weighted pieces of the second map data.

3. The map data processing device according to claim 2, wherein the map database is stored in a storage medium that is managed by a server device outside of the vehicle, and
wherein the update data computing module is further configured to compute average data of all vehicles connected to the server device to compute the update data.

4. The map data processing device according to claim 3, wherein the data processing module is further configured to create, at a determined interval, an interpolation point in an area in which road information is absent from the map database.

5. The map data processing device according to claim 2, wherein the data processing module is further configured to create, at a determined interval, an interpolation point in an area in which road information is absent from the map database.

6. The map data processing device according to claim 1, wherein the update determining module is further configured to:
compute a traveling frequency from data of a date on which the vehicle travels on the road; and
determine to update the map database, based on a proportion of the frequency to the traveling frequency.

7. The map data processing device according to claim 6, wherein the map database is stored in a storage medium is managed by a server device outside of the vehicle, and
wherein the update data computing module is further configured to compute average data of all vehicles connected to the server device to compute the update data.

8. The map data processing device according to claim 7, wherein the data processing module is further configured to create, at a determined interval, an interpolation point in an area in which road information is absent from the map database.

9. The map data processing device according to claim 6, wherein the data processing module is further configured to create, at a determined interval, an interpolation point in an area in which road information is absent from the map database.

10. The map data processing device according to claim 1, wherein the map database is stored in a storage medium that is managed by a server device outside of the vehicle, and
wherein the update data computing module is further configured to compute average data of all vehicles connected to the server device to compute the update data.

11. The map data processing device according to claim 10, wherein the data processing module is further configured to create, at a determined interval, an interpolation point in an area in which road information is absent from the map database.

12. The map data processing device according to claim 1, wherein the data processing module is further configured to create, at a determined interval, an interpolation point in an area in which road information is absent from the map database.

13. The map data processing device according to claim 1, wherein the surrounding environment of the vehicle is acquired by at least one stereo camera installed on the vehicle, and
wherein the surrounding environment of the vehicle includes at least one of a road curvature, a road azimuth, a lane width, a type of white line, a number of lanes, or a road shoulder width.

14. The map data processing device according to claim 1, wherein a travelling state of the vehicle is acquired by at least one of a speed sensor or a yaw rate sensor in the vehicle.

15. The map data processing device according to claim 1, wherein the numerical value of the reliability is set further based on a difference between a first value of the second map data at a current time instance and a second value of the second map data at a first time instance, and wherein the first time instance is prior to the current time instance.

16. The map data processing device according to claim 1, wherein the update determination comprises:
comparison of a second determination value with the multiplication product; and
determination to update the first map data with the update data, wherein the determination to update the first map data with the update data is based on the comparison of the second determination value with the multiplication product.

17. A map data processing device, comprising:

a map database that has first map data of a road on which a vehicle travels;

a map data computing module configured to compute second map data and third map data which is more latest than the second map data of the road, based on a surrounding environment of the vehicle and a traveling state of the vehicle;

an update data computing module configured to compute update data to update the map database, based on a weighted average value of at least second map data and third map data for reliabilities of at least the second map data and the third map data, each of the reliabilities being a numerical value that is set based on at least stability of a recognition state of the surrounding environment by one or more cameras equipped on the vehicle, stability of vehicle behavior detected by one or more sensors equipped on the vehicle, and stability of reception state of GPS signals received by the vehicle;

an update determining module configured to:
 compare the first map data with the update data;
 determine an error between the first map data and the update data; and
 determine, by update determination, to update the first map data with the update data, wherein the determination to update the first map data with the update data is based on at least a reliability of the update data and a frequency with which the error is greater than or equal to a determination value; and a data processing module configured to update the map database with the update data based on at least a result of the update determination.

* * * * *